(12) United States Patent
Taniguchi et al.

(10) Patent No.: US 11,979,462 B2
(45) Date of Patent: May 7, 2024

(54) DATA COLLECTION SYSTEM AND DATA COLLECTION METHOD

(71) Applicant: NIPPON TELEGRAPH AND TELEPHONE CORPORATION, Tokyo (JP)

(72) Inventors: Tomohiro Taniguchi, Musashino (JP); Shinya Tamaki, Musashino (JP); Tetsuya Suzuki, Musashino (JP); Yasutaka Kimura, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/800,797

(22) PCT Filed: Feb. 21, 2020

(86) PCT No.: PCT/JP2020/007247
§ 371 (c)(1),
(2) Date: Aug. 18, 2022

(87) PCT Pub. No.: WO2021/166260
PCT Pub. Date: Aug. 26, 2021

(65) Prior Publication Data
US 2023/0099790 A1  Mar. 30, 2023

(51) Int. Cl.
*H04L 67/12* (2022.01)
*G16Y 20/00* (2020.01)

(52) U.S. Cl.
CPC ............. *H04L 67/12* (2013.01); *G16Y 20/00* (2020.01)

(58) Field of Classification Search
None
See application file for complete search history.

(56) References Cited

U.S. PATENT DOCUMENTS 9,755,956 B1\* 9/2017 Song ................ H04L 45/26
2014/0155031 A1 6/2014 Lee et al.
(Continued)

FOREIGN PATENT DOCUMENTS

| JP | 2009260778 A | 11/2009 |
| JP | 2014110638 A | 6/2014 |
| JP | 2016522492 A | 7/2016 |

OTHER PUBLICATIONS

Deben Bhattarai, Link Layer Discovery Protocol (LLDP), 2020. Cisco, https://learningnetwork.cisco.com/s/article/link-layer-discovery-protocol-lldp-x (Year: 2020).\*

(Continued)

*Primary Examiner* — Chris Parry
*Assistant Examiner* — Abderrahmen Chouat
(74) *Attorney, Agent, or Firm* — Harness, Dickey & Pierce, P.L.C.

(57) ABSTRACT

An object of the present disclosure is to provide a data collection system and a data collection method which are capable of collecting sensing data and various pieces of metadata by a single communication protocol and capable of associating the sensing data with the metadata without errors. A data collection system 301 of the present disclosure is a data collection system that performs communication from a terminal 11 to a data collection unit 12 by a standardized communication protocol (LLDP or HTIP), in which the terminal 11 stores sensing data detected by a sensor device in an extended field different from a field in which metadata is stored, within a frame specified by the communication protocol, and the data collection unit 12 associates the sensing data with the metadata based on information for identifying the terminal described in the frame.

10 Claims, 6 Drawing Sheets

(56) References Cited

U.S. PATENT DOCUMENTS

| | | | |
|---|---|---|---|
| 2014/0340243 A1 | 11/2014 | Becker et al. | |
| 2014/0361906 A1* | 12/2014 | Hughes | H04Q 9/00 340/870.01 |
| 2020/0026339 A1* | 1/2020 | Sebastian | H04L 67/125 |
| 2021/0184886 A1* | 6/2021 | Maeda | H04L 69/16 |
| 2022/0386090 A1* | 12/2022 | Temkin | G06F 3/011 |

OTHER PUBLICATIONS

Yoshiyuki Mihara et al., Designing HTIP which Identifies Home Network Topology and Applying HTIP to a Troubleshooting Application, Information Processing Society Journal Consumer Device & System, vol. 2, No. 3, 2012, pp. 34-45.

Toshihiko Oda et al., An Approach of Defining, Generating and Utilizing Metadata for Sensing Data Trading Market, The 32nd Annual Conference of the Japanese Society for Artificial Intelligence, 2018, Jun. 2018.

LAN/MAN Standards Committee of the IEEE Computer Society, IEEE Standard for Local and metropolitan area networks—Station and Media Access Control Connectivity Discovery, IEEE Std 802.1AB™-2016, Mar. 11, 2016.

The Telecommunication Technology Committee, HTIP: Home-network Topology Identifying Protocol, TTC Standard JJ-300.00, Version 3.0, May 25, 2017.

\* cited by examiner

DATA COLLECTION SYSTEM AND DATA COLLECTION METHOD

CROSS-REFERENCE TO RELATED APPLICATIONS

This application is a 371 U.S. National Phase of International Application No. PCT/JP2020/007247, filed on Feb. 21, 2020. The entire disclosure of the above application is incorporated herein by reference.

TECHNICAL FIELD

The present disclosure relates to sensing data collection in the Internet of Things (IoT).

BACKGROUND ART

Network configuration information or instrument information of a terminal or an instrument is acquired using a lightweight communication protocol that is standardized and does not need high performance. For example, NPL 1 reports a method using link layer discovery protocol (LLDP).

In the IoT, a large number of sensor terminals are connected to a network to collect data (sensing data) generated by these sensor terminals. In addition, in data utilization in the IoT, the importance of not only sensing data generated by the sensor terminals but also data relating to the sensing data called metadata has been reported (NPL 2 or the like), and it is expected that users can utilize the sensing data safely and easily by acquiring and distributing the sensing data and the metadata together. For example, in a case where LLDP disclosed in NPL 1 is used, metadata (instrument information) such as a maker's name or a model number related to the sensing data can be collected with an economical system configuration.

CITATION LIST

Non Patent Literature

NPL 1: Yoshiyuki Mihara, Takefumi Yamazaki, Manabu Okamoto, Atsushi Sato, "Designing HTIP which Identifies Home Network Topology and Applying HTIP to a Troubleshooting Application", Transactions of Information Processing Society of Japan Consumer Devices & Systems, Vol. 2, No. 3, pp. 34-45, December 2012.
NPL 2: Toshihiko Oda, Hiroshi Imai, Takeshi Naito, Hajime Takebayashi, "An Approach of Defining, Generating and Utilizing Metadata for Sensing Data Trading Market", Proceedings of the Annual Conference of the Japanese Society for Artificial Intelligence, 2018 ($32^{nd}$), June 2012.
NPL 3: IEEE Std 802.1AB-2016, "IEEE Standard for Local and metropolitan area networks-Station and Media Access Control Connectivity Discovery"
NPL 4: TTC Standard JJ-300.00, "HTIP: Homenetwork Topology Identifying Protocol, Third Edition", May 25, 2017

SUMMARY OF THE INVENTION

Technical Problem

An IoT system needs to efficiently collect sensing data from an IoT terminal/instrument and to manage and utilize metadata such as instrument information or network configuration information and the sensing data in association with each other.

In order to achieve this, it is conceivable to operate individual communication protocols for collecting the sensing data and to develop/construct a dedicated system or manually associate the sensing data with separately collected metadata. However, these approaches have the following difficulties.

(1) The development/construction of a plurality of systems or the manual collection and operation will increase costs and complicate operations.
(2) Errors (for example, human errors) occur when separately acquired sensing data and metadata are associated with each other.

While a collection method for solving these difficulties is expected, specific measures have not been revealed. Consequently, in order to solve the above problems, an object of the present disclosure is to provide a data collection system and a data collection method which are capable of collecting sensing data and various pieces of metadata by a single communication protocol and capable of associating the sensing data with the metadata without errors.

Means for Solving the Problem

In order to solve the above problems, the data collection system according to the present disclosure uses a lightweight communication protocol such as LLDP, stores the sensing data in a specific extended field of a frame, and collectively transmits the sensing data and various pieces of metadata.

Specifically, according to the present disclosure, there is provided a data collection system that performs communication from a terminal to a data collection unit by a communication protocol that is standardized, in which the terminal stores sensing data detected by a sensor device in an extended field different from a field in which metadata is stored, within a frame specified by the communication protocol, and the data collection unit associates the sensing data with the metadata based on information for identifying the terminal described in the frame.

In addition, according to the present disclosure, there is provided a data collection method for performing communication from a terminal to a data collection unit by a communication protocol that is standardized, the method including storing, by the terminal, sensing data detected by a sensor device in an extended field different from a field in which metadata is stored, within a frame specified by the communication protocol, and associating, by the data collection unit, the sensing data with the metadata based on information for identifying the terminal described in the frame.

LLDP is a lightweight communication protocol that is standardized in the data collection system of the IoT and does not need high performance. This data collection system collectively collects the sensing data and various pieces of metadata by a lightweight and standardized communication protocol such as LLDP. Thus, it is possible to achieve an economical and reliable system by avoiding an increase in costs, complication of operation, and occurrence of errors when the sensing data and the metadata are associated with each other, which have been problems in methods of the related art.

Thus, the present disclosure can provide a data collection system and a data collection method which are capable of collecting sensing data and various pieces of metadata by a single communication protocol and capable of associating the sensing data with the metadata without errors.

There is a limitation to the size of an extended field in a frame of a standardized communication protocol. Thus, it is preferable that the terminal processes and stores the sensing data to fit into the extended field or divides the sensing data to fit into the extended field and stores pieces of sensing data that are divided in a plurality of frames.

In addition, the terminal may make, as the sensing data, a record in which information acquired by the sensor device is accumulated for a certain period of time or a result obtained by performing specific calculation.

The terminal may change at least one of a detail of the sensing data, a timing of detection of the sensing data, or a transmission interval of the frame spontaneously or in accordance with an instruction from the data collection unit.

For the purpose of redundancy, the data collection system according to the present disclosure is configured such that there are a plurality of the data collection units, and that the terminal transmits the frame having the same content to each of the plurality of the data collection units.

Effects of the Invention

The present disclosure can provide a data collection system and a data collection method which are capable of collecting sensing data and various pieces of metadata using a single communication protocol and capable of associating the sensing data with the metadata without errors.

DESCRIPTION OF EMBODIMENTS

Embodiments of the present disclosure will be described below with reference to the accompanying drawings. The embodiments to be described below are examples of the present disclosure, and the present disclosure is not limited to the following embodiments. In this description and the drawings, constituent elements having the identical reference signs are assumed to be the same as each other.

Embodiment 1

Figure 1:
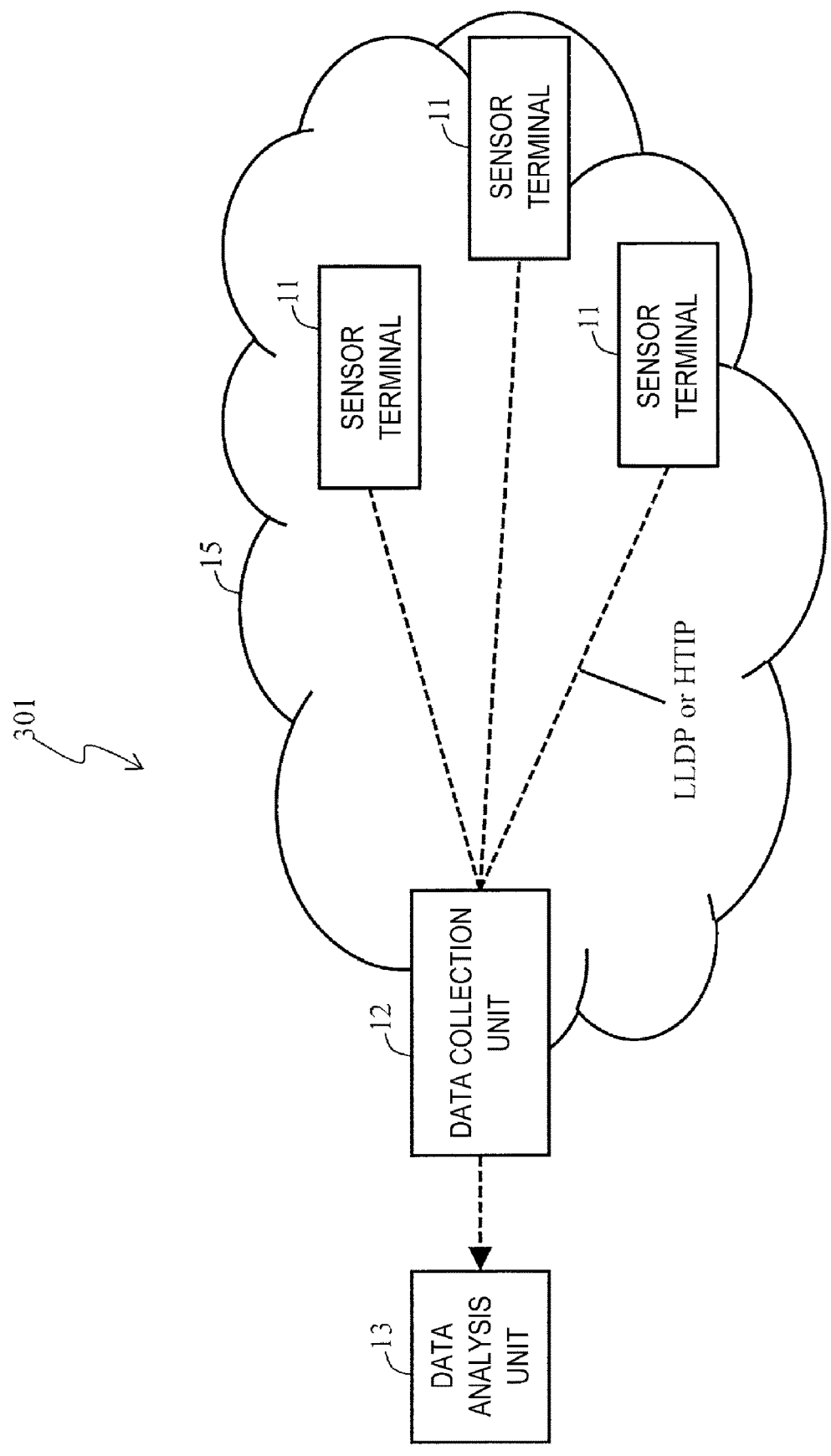
FIG. 1 is a diagram illustrating a data collection system according to the present disclosure.

FIG. 1 is a diagram illustrating a data collection system 301 according to the present embodiment. The data collection system 301 is a data collection system that performs communication from a terminal 11 to a data collection unit 12 by a standardized communication protocol (LLDP or HTIP), in which the terminal 11 stores sensing data detected by a sensor device in an extended field different from a field in which metadata is stored within a frame specified by the communication protocol, and the data collection unit 12 associates the sensing data with the metadata based on information for identifying the terminal described in the frame.

A data collection network 15 is a network that connects the sensor terminal 11 present in a specific range and the data collection unit 12. The data collection network 15 is, for example, a local area network (LAN), a field area network (FAN), an IoT area network, and the like.

The sensor terminal 11 senses a target for observation and generates sensing data. In the same data collection network 15, there may be a plurality of sensor terminals 11 of a single type and there may be multiple types of sensor terminals. The sensor terminal 11 uses a lightweight and standardized communication protocol such as, for example, LLDP or HTIP to collectively transmit the sensing data and various types of metadata such as instrument information including a product name/model number and network configuration information to the data collection unit 12. The details of the sensor terminal 11 will be described below.

The data collection unit 12 is, for example, an IoT gateway, an access point, or any of various other storage devices. The data collection unit 12 passes the collected sensing data and metadata as information in a state associated with the sensor terminal 11 to a data analysis unit 13. The details of the data collection unit 12 will also be described below.

The data analysis unit 13 stores the information passed from the data collection unit 12 and uses the stored information for analysis. The data analysis unit 13 may be in the same device as the data collection unit 12 or may be in a separate device. In a case where the data analysis unit is in a separate device, it may be located away from the data collection unit 12 through a network.

Figure 2:
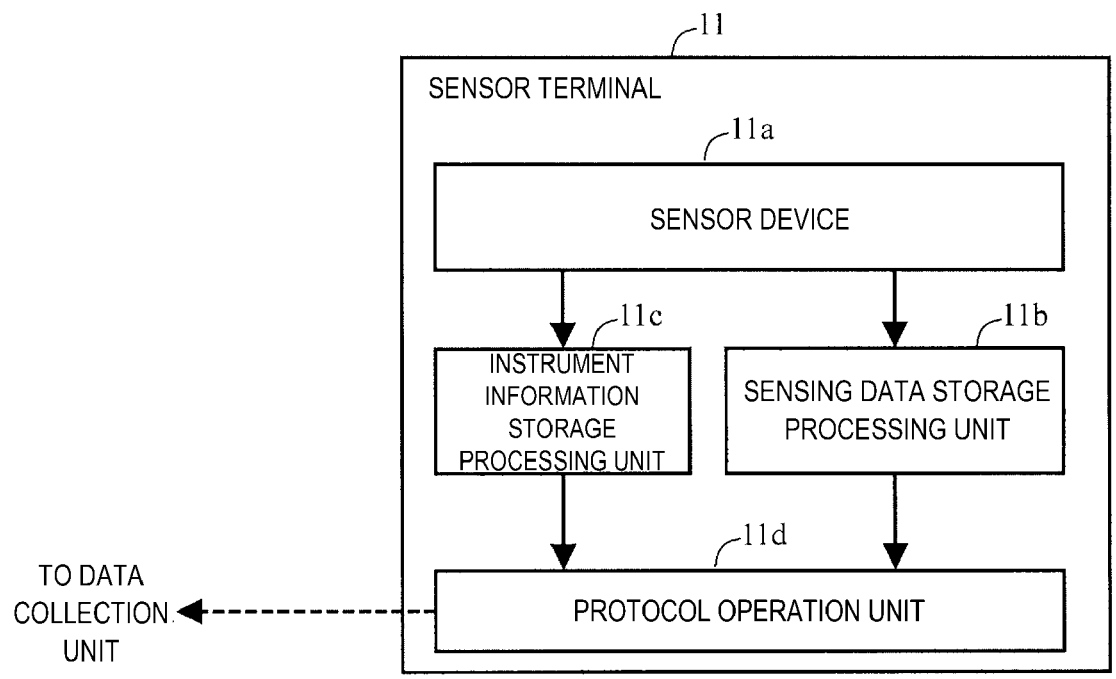
FIG. 2 is a diagram illustrating a terminal included in the data collection system according to the present disclosure.

FIG. 2 is a diagram illustrating the sensor terminal 11. The sensor terminal 11 includes a sensor device 11a, an instrument information storage processing unit 11c, a sensing data storage processing unit 11b, and a protocol operation unit 11d. The sensor device 11a senses a target for observation. The instrument information storage processing unit 11c collects instrument information of a target for observation (such as, for example, the maker's name, model name, and model number of an instrument), and stores the information at a predetermined position in a frame. The sensing data storage processing unit 11b stores the sensing data from the sensor device 11a in a specific extended field of a frame. The protocol operation unit 11d transmits a frame in which the sensing data is stored in a specific extended field to the data collection unit 12. LLDP and HTIP(JJ-300.00) can be given as examples of the communication protocol.

In order to comply with the format/limitation of a specific extended field of a frame, the sensing data storage processing unit 11b may store the sensing data in a frame after processing such as converting the sensing data into a certain abbreviated code and then storing it, or dividing the sensing data and then storing them into a plurality of frames (fragmentation).

The sensing data storage processing unit 11b can freely set a storage timing at which the sensing data is stored in a frame. For example, the storage timing may be set each time the sensing data is updated, or the sensing data may be stored at a timing when the sensing data is accumulated for a certain period of time instead of being stored sequentially. In addition, in a case where the sensing data is accumulated for a certain period of time, the sensing data storage processing unit 11b may store, in a frame, the record (log) of the accumulation or the result of specific calculation/statistical processing.

The detail and storage timing of the sensing data stored in a frame may be fixed or variable. The detail and storage timing of the sensing data may be dynamically changed according to the decision of the sensor terminal 11 itself or instructions from the data analysis unit 13 and the data collection unit 12.

In addition, the transmission interval of the frame may also be fixed or variable. The transmission interval of the frame may be dynamically changed according to the decision of the sensor terminal 11 itself or instructions from the data analysis unit 13 and the data collection unit 12.

Figure 3:
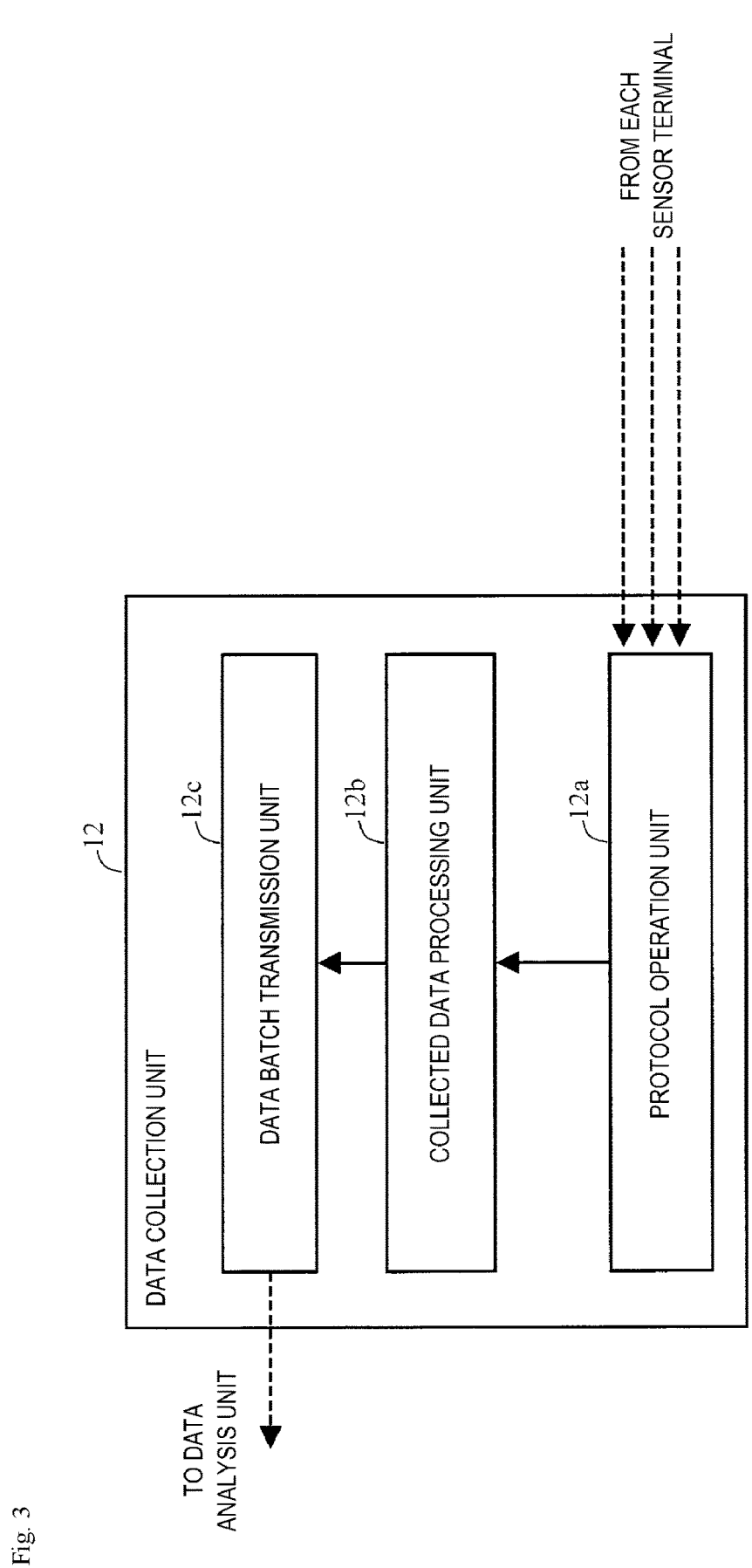
FIG. 3 is a diagram illustrating a data collection unit included in the data collection system according to the present disclosure.

FIG. 3 is a diagram illustrating the data collection unit 12. The data collection unit 12 includes a protocol operation unit 12a, a collected data processing unit 12b, and a data batch transmission unit 12c. The protocol operation unit 12a receives a frame in which the sensing data is stored in a specific extended field from the sensor terminal 11. LLDP and HTIP(JJ-300.00) can be given as examples of the communication protocol. The collected data processing unit 12b extracts the sensing data and various pieces of metadata from the received frame and arranges them in a database based on information (example: a MAC address) for identifying the individual of the sensor terminal 11. The data batch transmission unit 12c stores the data arranged in the database at a predetermined timing in a payload portion of a frame and transmits the frame to the data analysis unit 13. The data batch transmission unit 12c may transmit only a portion of the data in the database or may transmit all the data, in accordance with the requirements of the data analysis unit 13.

Figure 4:
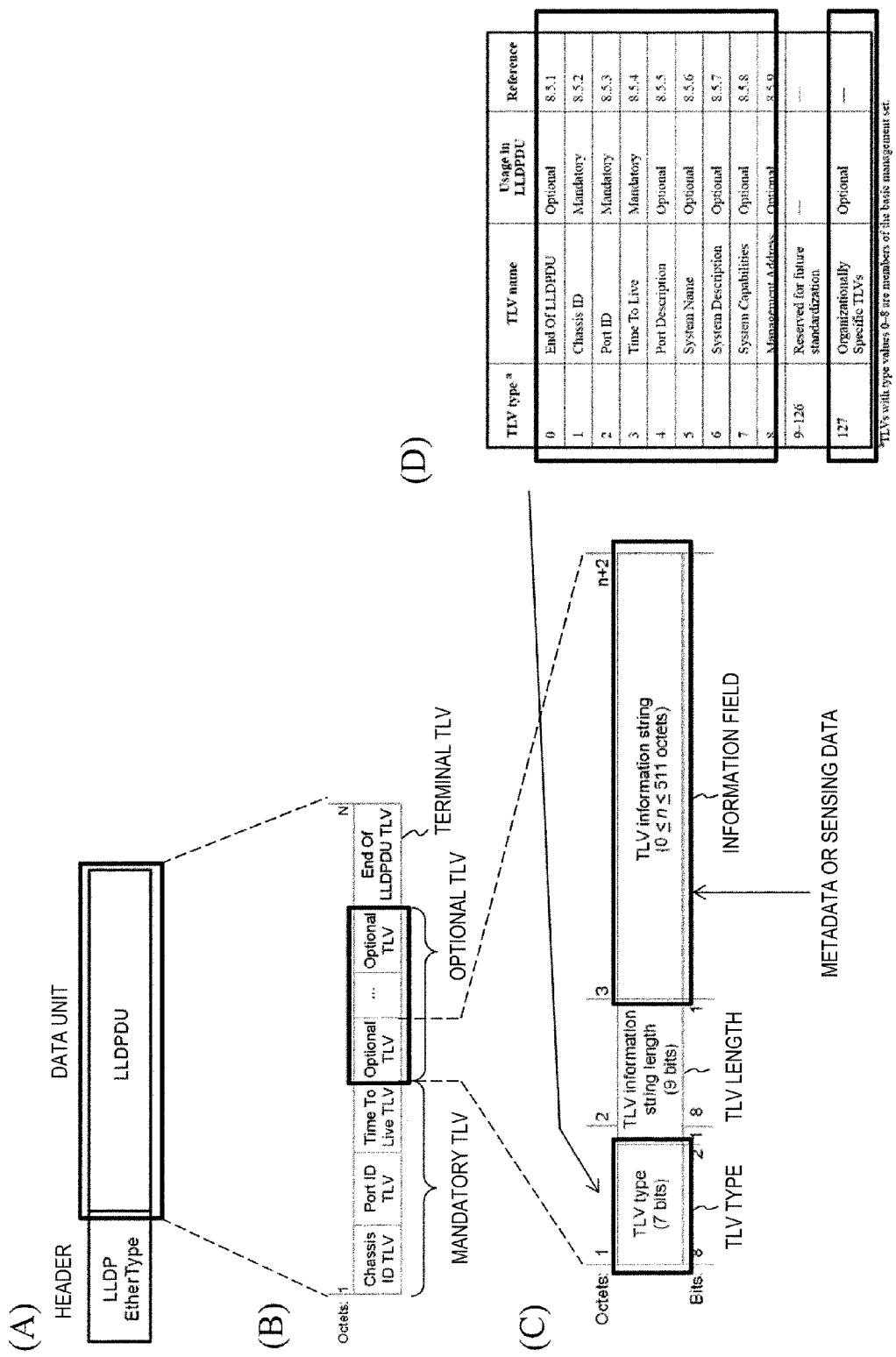
FIG. 4 is a diagram illustrating an example in which the data collection system according to the present disclosure stores sensor data and metadata in a frame.

FIG. 4 is a diagram illustrating an example in which sensor data and metadata are stored in a frame in a case where the data collection system 301 adopts LLDP (see, for example, NPL 3) as a communication protocol. FIG. 4(A) is a diagram illustrating a frame structure of LLDP. The frame of LLDP is constituted by a header and a data unit. FIG. 4(B) is a diagram illustrating a format of the data unit. The data unit is constituted by a mandatory TLV, an optional TLV, and a terminal TLV. FIG. 4(C) is a diagram illustrating a format of one optional TLV. The optional TLV is constituted by a TLV type, a TLV length, and an information field. FIG. 4(D) is a list of optional TLV types. In a case where "1" to "8" are input to the TLV type, various pieces of information such as a device name, a maker's name, a MAC address, or an IP address can be stored as metadata in the information field of the optional TLV. In addition, in a case where "127" is input to the TLV type, the information field of the optional TLV becomes an extended field, which makes it possible to store sensing data.

Figure 5:
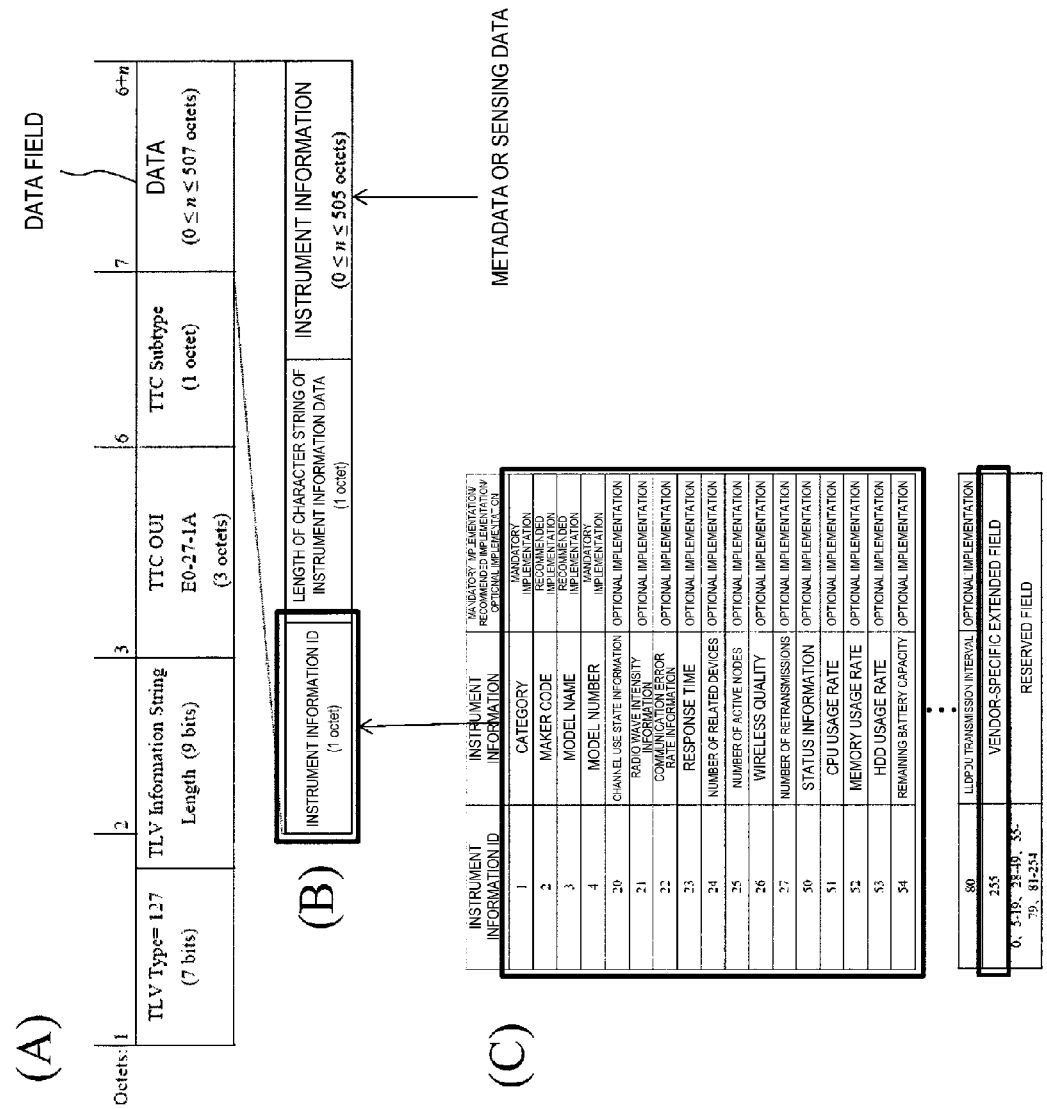
FIG. 5 is a diagram illustrating an example in which the data collection system according to the present disclosure stores sensor data and metadata in a frame.

FIG. 5 is a diagram illustrating an example in which sensor data and metadata are stored in a frame in a case where the data collection system 301 adopts HTIP (see, for example, NPL 4) as a communication protocol. FIG. 5(A) is a diagram illustrating a frame structure of HTIP. The frame of HTIP is constituted by a field for describing a TLV type and length and a data field. FIG. 5(B) is a diagram illustrating a format of the data field. The data field is constituted by an instrument information ID, an instrument information data length, and instrument information. FIG. 5(C) is a list of instrument information IDs. In a case where "1" to "4", "20" to "27", and "50" to "54" are input to the instrument information ID, various pieces of information such as a device name, a maker's name, a MAC address, or an IP address can be stored as metadata in the instrument information field of the data field. In addition, in a case where "255" is input to the instrument information ID, the instrument information field of the data field becomes a vendor-specific extended field, which makes it possible to store sensing data.

Embodiment 2

Figure 6:
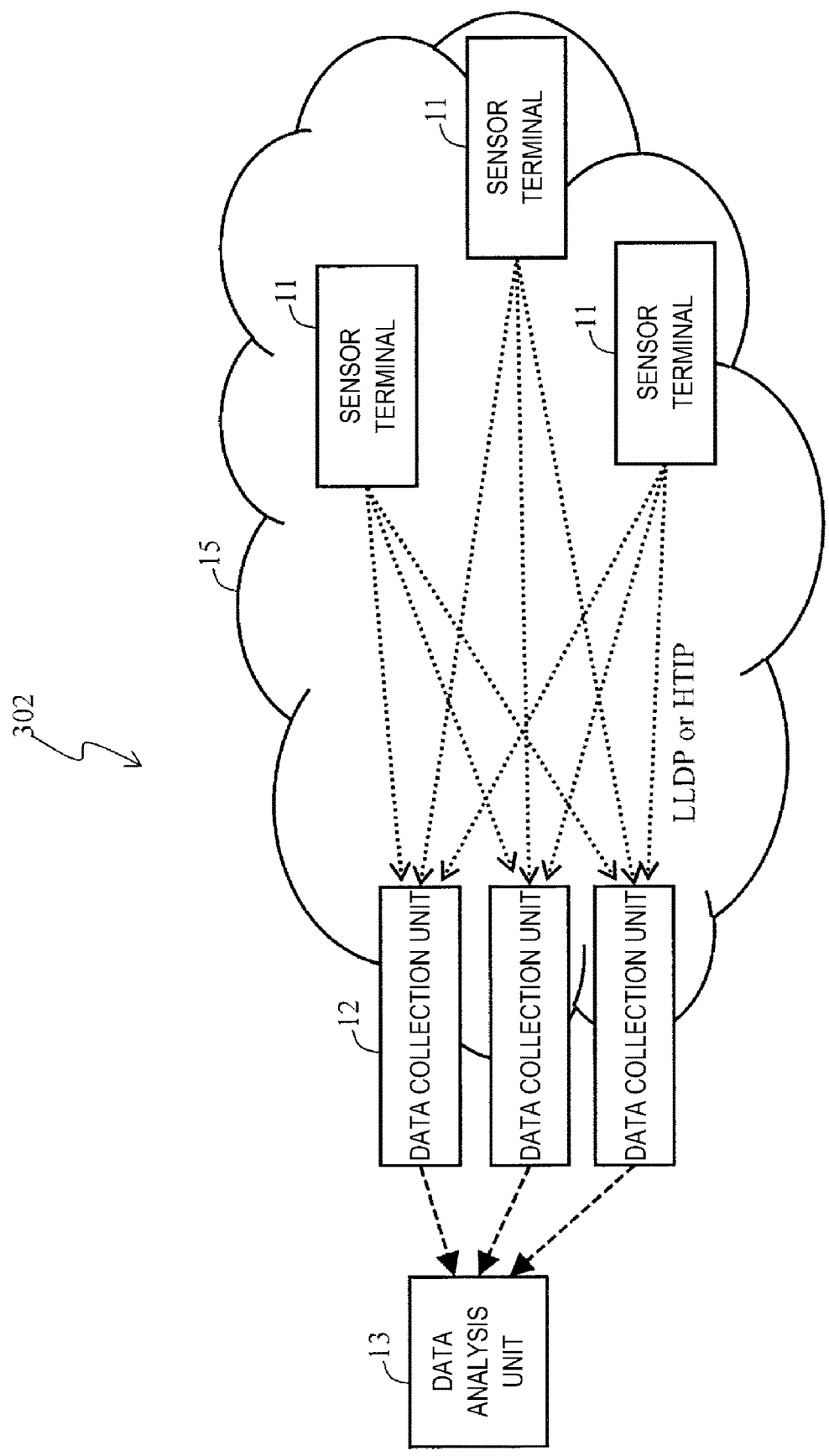
FIG. 6 is a diagram illustrating a data collection system according to the present disclosure.

FIG. 6 is a diagram illustrating a data collection system 302 of the present embodiment. The data collection system 302 is different from the data collection system 301 of FIG. 1 in that the number of data collection units 12 is plural. That is, the data collection system 302 is characterized in that there are a plurality of data collection units 12, and that the terminal 11 transmits a frame having the same content to each of the data collection units 12.

The operation of the sensor terminal 11 is the same as the operation described in Embodiment 1. However, during transmission of a frame, the sensor terminal 11 transmits the frame simultaneously to a plurality of data collection units 12 in the data collection network 15 through the broadcast operation of LLDP or HTIP.

The operation of each of the data collection units 12 is the same as the operation described in Embodiment 1. The data analysis unit 13 can acquire sensing data and metadata arranged for each sensor terminal 11 from the plurality of data collection units 12. In a case where data from the plurality of data collection units 12 is the same, it is only required that the data analysis unit 13 adopts data from any of the data collection units 12. In addition, in a case where data from a certain data collection unit 12 is missing, it is possible to avoid data loss by adopting data from another data collection unit 12.

That is, the data collection system 302 can improve the reliability of the system through its redundancy as compared with the data collection system 301 of FIG. 1.

Other Embodiments

The sensor terminal 11 and the data collection unit 12 described above can also be implemented by a computer and a program, and the program can also be recorded in a recording medium and provided through a network.

REFERENCE SIGNS LIST

11 Sensor terminal
11a Sensor device
11b Sensing data storage unit
11c Instrument information storage unit
11d Protocol operation unit
12 Data collection unit
12a Protocol operation unit
12b Collected data processing unit
12c Data batch transmission unit
13 Data analysis unit
15 Data collection network
301, 302 Data collection system

The invention claimed is:
1. A data collection system, comprising:
a terminal configured to generate sensing data and transmit the sensing data, along with metadata for the terminal, over a network in accordance with a device discovery protocol, wherein the sensing data is stored in an extended field of a frame specified by the device discovery protocol, the metadata is stored in a field of the frame different than the extended field, and the device discovery protocol runs over data link layer of the network; and a data collection unit having a processor; and a storage medium having computer program instructions stored thereon, when executed by the processor, perform to:

receive the sensing data and the metadata from the terminal, and associates the sensing data with the metadata based on information for identifying the terminal described in the frame.

2. The data collection system according to claim 1, wherein the terminal divides the sensing data to fit into the extended field and stores pieces of sensing data that are divided in a plurality of frames.

3. The data collection system according to claim 1, wherein the terminal makes, as the sensing data, a record where information acquired by a sensor is accumulated for a certain period of time.

4. The data collection system according to claim 1, wherein the terminal changes at least one of a detail of the sensing data, a timing of detection of the sensing data, or a transmission interval of the frame spontaneously or in accordance with an instruction from the data collection unit.

5. The data collection system according to claim 1, wherein the data collection unit is one of a plurality of data collection units, and the terminal transmits the frame having an identical content to each of the plurality of data collection units.

6. The data collection system according to claim 1 wherein the device discovery protocol is further defined as Link Layer Discovery Protocol.

7. The data collection system according to claim 1 wherein the device discovery protocol is defined as Home-network Topology Identifying Protocol.

8. The data collection system according to claim 1 wherein the metadata for the terminal uniquely identifies the terminal.

9. The data collection system according to claim 1 wherein the metadata for the terminal includes a model number for the terminal.

10. A data collection method, comprising:

capturing, by a terminal, sensing data;

formatting, by the terminal, an extended field of a frame specified by Link Layer Discovery Protocol with the sensing data;

formatting, by the terminal, another field of the frame with metadata for the terminal;

transmitting, by the terminal, the frame over a network in accordance with the Link Layer Discovery Protocol;

receiving, by a data collection unit, the frame from the terminal; and associating, by the data collection unit, the sensing data with the metadata based on information for identifying the terminal contained in the frame.

* * * * *